Dec. 20, 1966     D. E. BENNER     3,292,866
WINDSHIELD CLEANING SYSTEM
Filed April 5, 1965
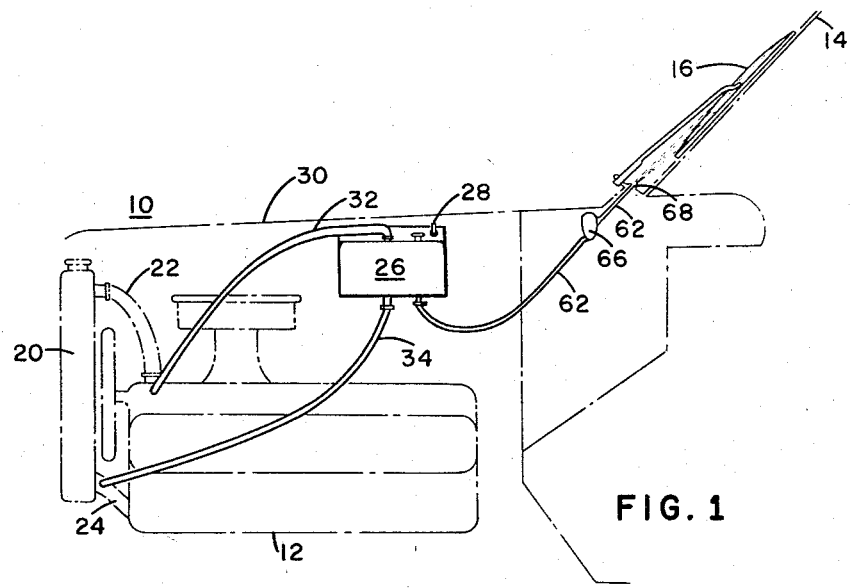
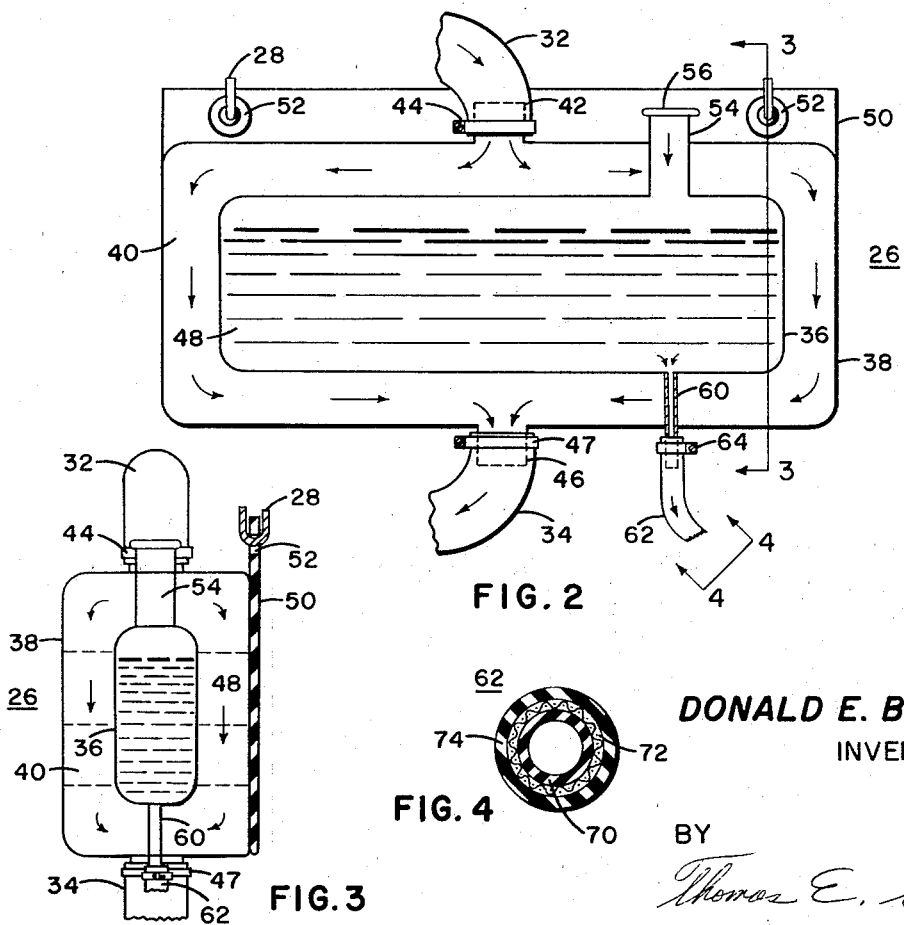
DONALD E. BENNER
INVENTOR
BY
*Thomas E. Sterling*
ATTORNEY

United States Patent Office 3,292,866
Patented Dec. 20, 1966

3,292,866
WINDSHIELD CLEANING SYSTEM
Donald E. Benner, 229 W. Irvin Ave.,
State College, Pa. 16801
Filed Apr. 5, 1965, Ser. No. 445,442
7 Claims. (Cl. 239—284)

This invention relates to windshield cleaning systems and in particular to windshield cleaning systems capable of operating at low temperatures.

Windshield cleaning systems have been used on motor vehicles for some time. The general operation of such systems depend upon a cleaning fluid stored in a fluid reservoir, often under the hood of the car, being forced onto the windshield and wiped off by the windshield wipers. Thus by manually controlling the windshield wipers and cleaning spray, the operator of the vehicle may spray the cleaning fluid upon his windshield and immediately wipe it off by means of the sweeping windshield wipers thus cleaning dirt and grime from the windshield surface and improving his vision. In extremely cold weather and sloppy road conditions when windshield cleaners are most needed, the reservoir containing the liquid cleaning solution is often frozen into a solid or semi-solid state, thus rendering the windshield cleaning system inoperative. Although an anti-freezing solution is frequently added to the cleaning solution, freezing still takes place. Thus, at a time when windshield cleaning is needed the most, the windshield cleaning system is oftentimes inoperative.

It is an object of this invention therefore to provide a windshield cleaning system which will not freeze and hence remain operable in cold weather.

It is another object of this invention to provide a windshield washer reservoir which is kept hot by continuously flowing hot fluid from the cooling system of the engine.

It is yet another object of this invention to provide a cleaning fluid delivery tube which is insulated so as not to freeze at low temperatures.

It is still another object of this invention to provide an entire fluid reservoir of liquid for a windshield cleaning system which is heated so that it can not solidify or become semi-solid during cold weather.

It is another object of this invention to provide a windshield cleaning system which will provide a hot cleaning fluid to the windshield to be cleaned.

Other objects and a fuller understanding of the invention may be had by referring to the following description and claims, taken in conjunction with the accompanying drawing, in which:

FIGURE 1 is a side view illustrating the present invention incorporated in a motor vehicle;

FIGURE 2 is a longitudinally taken cross-sectional view of this invention;

FIGURE 3 is a cross-sectional view taken along the line 3—3 of FIGURE 2 and;

FIGURE 4 is a cross-sectional view of the pump hose taken along the line 4—4 of FIGURE 3.

With reference to the drawing, the invention is illustrated as being incorporated in a motor vehicle indicated generally by the reference character 10. Having an engine 12 under the hood portion thereof, a windshield 14 above and to the rear of the engine 12 and windshield wiper 16 in contact with the windshield 14 and attached below to the vehicle body 18. Radiator 20 is positioned in the forward portion of engine 12 and in communication therewith through upper hose 22 and lower hose 24.

Windshield washing fluid reservoir 26 is hung by means of hooks 28 attached to the side of fender well 30 which is located along the side of engine 12. An intake hose 32 is attached to fluid cooling system (not shown) of engine 12 near the water pump (not shown) and to reservoir 26 so that when the engine 12 is operating, hot cooling system fluid will be forced through intake hose 32 and into reservoir 26. An outflow hose 34 is connected to the lower portion of fluid reservoir 26 and is attached to lower hose 24 and serves as a return for the cooling fluid. In practice, it is possible to attach intake hose 32 and outflow hose 34 to any convenient portion of the engine cooling system that will permit fluid flow therethrough.

Referring now to FIGURES 2 and 3, windshield washing fluid reservoir 26 is comprised of inner container 36 which is surrounded by outer jacket 38 so as to leave a jacket area 40 completely surrounding inner container 36. Jacket area 40 is in communication with intake hose 32 which is clamped upon intake jacket tube 42, positioned on the upper part of outer jacket 38 and in communication with jacket area 40, by means of clamps 44. Likewise outflow hose 34 is in communication with jacket area 40 through outgo jacket tube 46 and is clamped thereto by clamp 47. Shock absorbing backing 50 is integrally attached to the back portion of fluid reservoir 26 so that it is positioned between fluid reservoir 26 and fender well 30 to cushion and buffer the fluid reservoir 26 and fender well 30 from jolting movements of vehicle 10 when it is being driven. The backing 50 may be composed of rubber, plastic or other shock absorbing material. The upper portion of the backing 50 has holes 52 therethrough upon which it is suspended by means of hooks 28.

A reservoir filler tube 54 having a removable cap 56 on the top portion thereof passes through the jacket area 40 into inner container 36 and serves as a means to add windshield cleaning fluid 48 to inner container 36. A fluid outlet tube 60 passes from the bottom of inner container 36 through jacket area 40 and is connected to pump hose 62 by means of clamp 64. The other end portion of pump hose 62 is connected to windshield washer pump 66 and continues therefrom to spraying nozzle 68 which sprays cleaning fluid 48 upon the outer surface of windshield 14. Windshield washer pump 66 and windshield wiper 16 may be controlled by the operator (not shown) of the vehicle 10 so that the cleaning fluid 48 will spray upon the windshield 14 when the windshield wiper 16 is sweeping, thus wiping the cleaning fluid 48 from the windshield 14, cleaning it.

Referring now to FIGURE 4, the pump hose 62 is comprised of an inner tube 70 through which passes the cleaning fluid 48. Surrounding this inner tube 70 is a wire mesh 72, and surrounding this an outer tube 74. Thus a dead air space is created between inner tube 70 and outer tube 74 by the wire mesh 72, hence temperature insulating the inner tube 70. The cleaning fluid 48 within the inner tube 70 is less prone to freeze.

In operation, cap 56 is removed from reservoir filler tube 54 and cleaning fluid 48 poured therethrough into inner container 36. When engine 12 is running, hot cooling fluid from the radiator 20 is forced through intake hose 32 to circulate through jacket area 40 and be returned to lower hose 24 by means of outflow hose 34. Thus the inner container 36 and cleaning fluid 48 therein is maintained at the high temperature of the engine cooling fluid, and will not freeze. When the windshield washer pump 66 and windshield wiper 16 are activated by the operator (not shown) of vehicle 10, cleaning fluid 48 is drawn through fluid outlet tube 60, pump hose 62 into windshield washer pump 66 from whence it is pumped to spraying nozzle 68 and sprayed upon the outer surface of windshield 14. Although the outside temperature may be very low, the cleaning fluid 48 is always maintained at a hot temperature, hence is not frozen into a solid or semi-solid mass. In addition the heated cleaning fluid 48 will clean the windshield more effectively than cool cleaning fluid in that it dissolves and loosens dirt and grime more easily. The insulating quality of pump hose 62 prevents the cleaning fluid 48 within it from freezing also. Thus when the windshield washer pump 66 is activated it will spray through spraying nozzle 68 a hot fluid solution upon the windshield 14 which will not immediately freeze before the windshield wiper 16 has swept it off.

Although this invention has been described with a certain degree of particularity, it is understood that the present disclosure has been made only by way of example and that numerous changes in the details of construction and the combination and arrangement of parts may be resorted to without departing from the spirit and the scope of the invention as hereinafter claimed.

I claim:

1. A window cleaning system for a motor vehicle having an engine with a hot fluid flow, and a windshield, comprising in combination:
   a reservoir; said reservoir containing window cleaning fluid;
   an outer jacket surrounding said reservoir forming a jacket space between said reservoir and said outer jacket;
   an intake duct in communication with said jacket space and said source of said hot fluid flow;
   an outflow duct in communication with said source of said hot fluid flow;
   a spray nozzle directed at said windshield and in communication with said reservoir;
   means to deliver said window cleaning fluid through said spray nozzle onto said windshield;
   whereby the hot fluid flow from said engine circulates through said jacket space to keep said window cleaning fluid hot.

2. The combination as claimed in claim 1 in which said means to deliver said window cleaning fluid comprises:
   a windshield washer pump; and
   tubing means connecting said pump between said reservoir and said spray nozzle.

3. The combination as claimed in claim 2 in which said tubing means is comprised of in combination:
   an inner insulated hose through which the fluid contents of said reservoir flow;
   a wired mesh wrapped around the periphery of said inner hose;
   an outer hose positioned around said wire mesh so as to form a dead air space between said inner hose and said outer hose to temperature insulate the contents of said inner hose.

4. The combination as claimed in claim 3 having a cushion-like backing integrally attached to said outer jacket and positioned between said jacket and the interior of said motor vehicle, said cushion-like backing having eyelet holes therein whereby it may be secured to the interior of said motor vehicle.

5. A window cleaning system for a motor vehicle with a windshield and having a fluid cooling system, comprising in combination:
   a reservoir, said reservoir containing window cleaning fluid;
   an outer jacket positioned about said reservoir so as to form a jacket space between said reservoir and said outer jacket;
   an intake tube leading from said cooling system to said jacket space;
   an outflow tube leading from said jacket space to said cooling system so adapted that hot fluids from said cooling system will flow through said jacket space and back to said cooling system;
   a filler tube extending through said outer jacket into said reservoir, said filler tube permitting easy filling of said reservoir with window cleaning fluid;
   a washer pump tube in communication with the lower portion of said reservoir;
   a washer pump in communication with said washer tube;
   a spray nozzle tube connected to said washer pump;
   a spray nozzle connected to said spray nozzle tube, said spray nozzle being directed at said windshield;
   means for activating said washer pump to force window cleaning fluid through said spray nozzle onto said windshield.

6. The combination as claimed in claim 5 in which said washer pump tube and said spray nozzle tube are comprised of in combination:
   an interior tube through which said window cleaning fluid flows;
   a wire mesh positioned around the periphery of said interior tube;
   an exterior tube positioned about the periphery of said wire mesh and leaving a dead air space between said interior tube and said outer tube;
   whereby the contents of said inner tube is temperature insulated.

7. The combination as claimed in claim 6 having a cushion-like backing integrally attached to said outer jacket and positioned between said outer jacket and the said motor vehicle, said cushion-like backing having eyelet holes therein;
   fastening means positioned on said motor vehicle by said eyelet holes may be engaged to support said outer jacket.

References Cited by the Examiner

UNITED STATES PATENTS

| | | | |
|---|---|---|---|
| 2,660,904 | 10/1941 | Horton | 239—284 |
| 2,576,198 | 11/1951 | Stuart | 239—130 |
| 2,903,189 | 9/1959 | Patton | 239—130 |
| 3,243,119 | 3/1966 | Merkle | 239—284 |

EVERETT W. KIRBY, *Primary Examiner.*